US005727298A

United States Patent [19]

Strong

[11] Patent Number: 5,727,298

[45] Date of Patent: Mar. 17, 1998

[54] ROLLER SHAFT EXTRACTOR

[75] Inventor: David N. Strong, East Haddam, Conn.

[73] Assignee: The United States of America as represented by the Secretary of the Navy, Washington, D.C.

[21] Appl. No.: 716,700

[22] Filed: Sep. 19, 1996

[51] Int. Cl.[6] .......... B23P 19/04

[52] U.S. Cl. .......... 29/259; 29/263; 29/256

[58] Field of Search .......... 29/258, 259, 260, 29/263, 262, 264, 265, 256; 279/51, 48, 46, 50, 52, 56, 57, 41, 42

[56] References Cited

U.S. PATENT DOCUMENTS

| | | | |
|---|---|---|---|
| 559,803 | 5/1896 | Johnson | 29/262 |
| 1,443,052 | 1/1923 | Stephens | 29/258 |
| 2,438,797 | 3/1948 | Bagge | 29/263 |
| 3,315,340 | 4/1967 | King | 29/259 |
| 4,059,883 | 11/1977 | Osborne | 29/259 |

*Primary Examiner*—Robert C. Watson
*Attorney, Agent, or Firm*—Michael J. McGowan; Robert W. Gauthier; Prithvi C. Lall

[57] ABSTRACT

An extractor for use in removing a solid, smooth, press fit shaft from a housing where access to the shaft is restricted. The extractor has a jacket and a collet. The collet fits around the shaft and the collet in turn fits within the jacket. The exterior of the collet end within which the shaft is placed is tapered and this tapered portion of the collet fits within a similarly tapered bore in the jacket. The collet has a threaded end opposite the tapered portion and the threaded end protrudes from the jacket when the tapered portion is fully seated within the tapered bore of the jacket. A nut is placed onto the threaded end and tightened such that the collet is pulled further into the jacket. The movement of the tapered portion within the tapered bore creates a wedging action which forces the collet against the shaft. As the nut is further tightened, the collet grips the shaft tighter. When the collet is sufficiently tightened about the shaft, jacking screws are inserted through a flange on the jacket and brought to bear against the shaft housing. Turning the jacking screws pulls the jacket, collet and attached shaft free of the housing.

5 Claims, 3 Drawing Sheets

ROLLER SHAFT EXTRACTOR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to an extractor for removing a press fit shaft from a confined space, and deals more particularly with an extractor for removing the guide tube roller shaft from the towed array guide on a submarine.

(2) Description of the Prior Art

Various assemblies utilizing rollers, such as the towed array guide roller assembly used in submarines, require the use of a shaft press fit into a confined space. The shafts are inserted into a housing with great force and consequently require a large force to remove the shaft. An extractor tool is used when a shaft needs to be removed for repair or replacement. Current extractors used for press fit shaft removal include a number of techniques to grab or hold onto the shaft and apply an axial force to remove the shaft from the housing. Where the shaft is tubular, the extractor is inserted into the shaft and the inserted end is expanded against the interior walls of the shaft to provide the gripping force as in the pipe puller of Grunsky, U.S. Pat. No. 2,939,739, or the tube extractor of LaFleur, U.S. Pat. No. 3,057,631. Shafts are also provided with internal threads such that the extractor is threaded into the shaft, the threads being used to transfer the axial pulling force to the shaft. Where the shaft is solid, the shaft may have external threads to which the extractor is attached. Similarly, the extractor may grip notches or bores machined into the outer surface of the shaft.

A highly polished solid shaft without threads, notches or bores is extremely difficult to engage for removal, especially where access to the end of the shaft is limited, as is the case in the towed array guide assembly. The sides of the housing for the guide assembly shaft extend beyond the end of the shaft making the shaft recessed within the housing. There is only a limited amount of space between the shaft and the housing. The solid, smooth shaft prevents the use of tube type extractors and extractors which attach to the shaft by means of threads, bores, or notches. The limited space prevents the attachment of clamps about the shaft and the application of the axial force necessary to remove the shaft from its housing. Additionally, access to the housing of the guide assembly shaft is also limited, requiring any tools used to extract the shaft to be compact. There is a need for an extractor for smooth shafts in confined spaces which can apply a strong gripping force to the shaft and translate the gripping force to an axial pulling force to remove the shaft from its housing.

SUMMARY OF THE INVENTION

Accordingly, it is a general purpose and object of the present invention to provide an extractor for removal of a press fit, solid, smooth shaft from its housing.

Another object is to provide an extractor for removal of a press fit, solid, smooth shaft from a confined space within its housing.

A further object is to provide an extractor which is compact and can easily be maneuvered in tight spaces.

A still further object is to provide an extractor which can be economically fabricated with standard machining practices.

These objects are accomplished with the present invention by providing an extractor which uses a wedging action to grip a smooth shaft and threaded jack screws to apply a pulling force to remove the shaft from its housing. A precision smooth bore collet, sized to accommodate the shaft, is placed over the shaft and a jacket placed over the collet. A nut engages the threaded end of the collet which extends beyond the jacket. Tightening the nut against the shoulder of the jacket raises the collet within the jacket and wedges the collet against the shaft. The jacket is further fitted with jack screws which engage the shaft housing. Tightening the jack screws raises the extractor and shaft from the housing.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
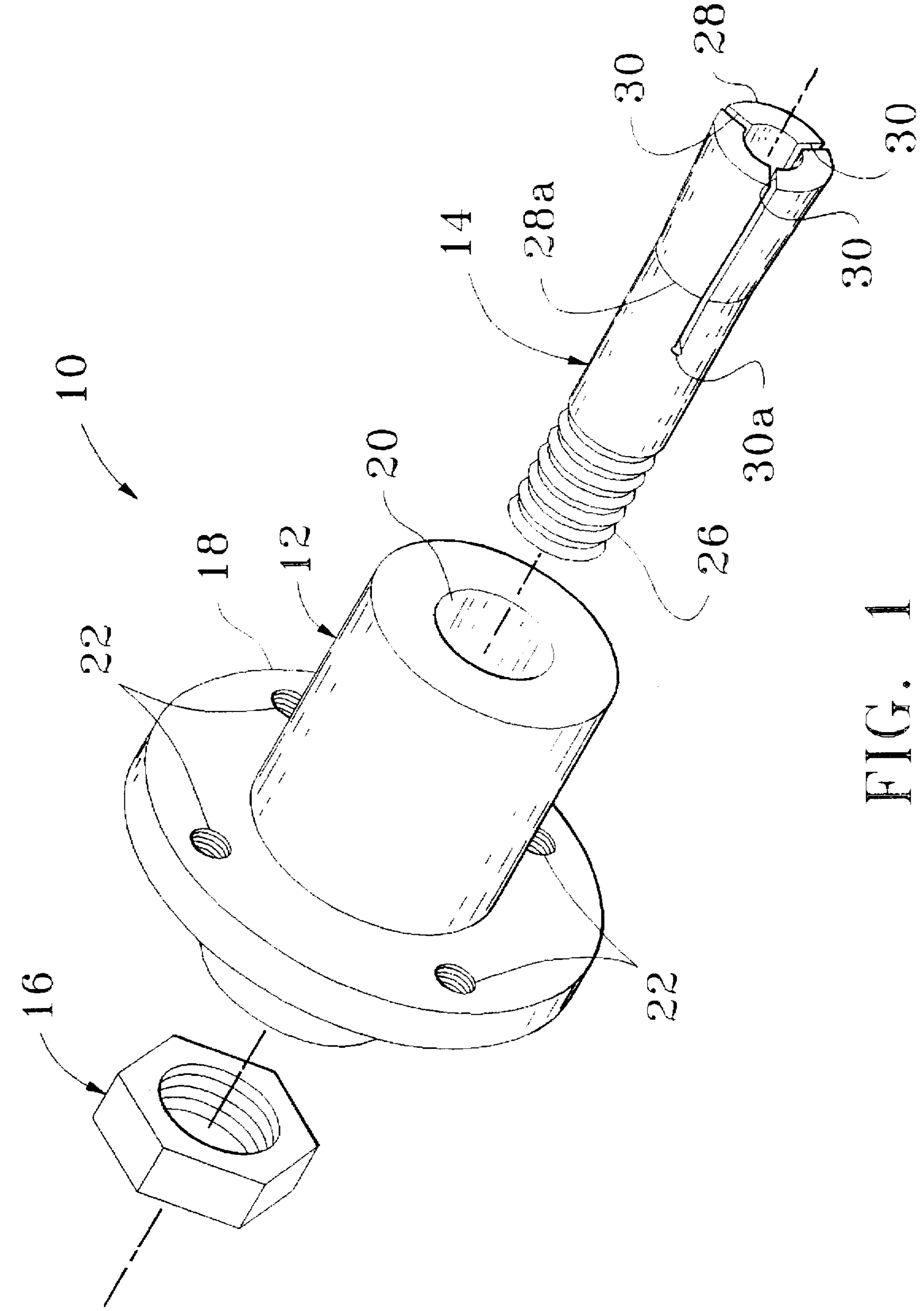
FIG. 1 shows an isometric view of the extractor with the collet portion and nut separate from the jacket portion.
Figure 2:
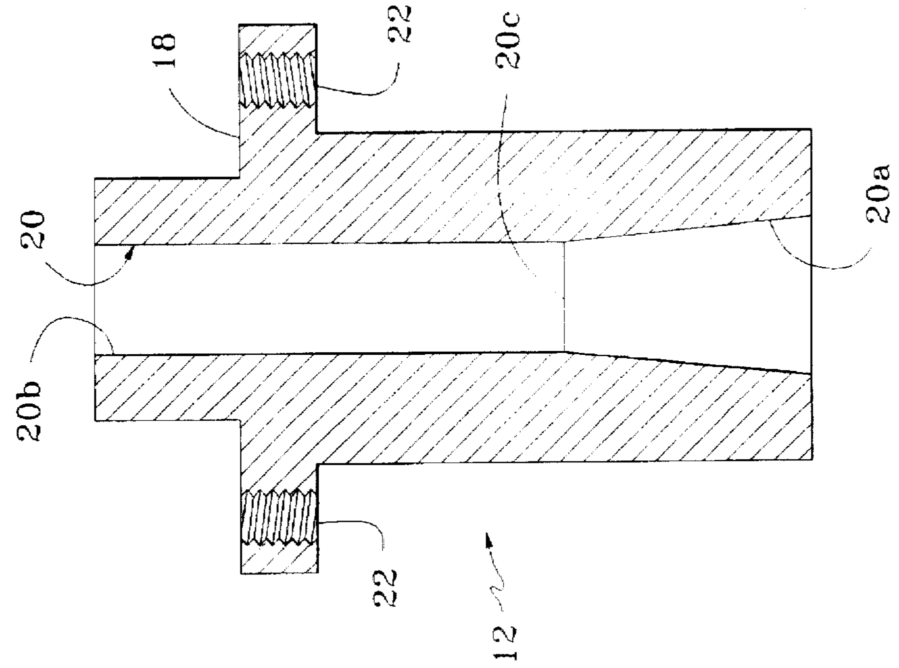
FIG. 2 shows a cross sectional view of the jacket portion of the extractor.

Referring now to FIG. 1, there is shown an isometric view of extractor 10 having a jacket 12, a collet 14 and a nut 16. Referring additionally to FIG. 2, jacket 12 is cylindrical in shape having flange 18 extending radially therefrom. Jacket bore 20 extends through jacket 12 along the longitudinal axis of jacket 12. Tapered end **20*a* of jacket bore 20 has a diameter slightly larger than straight end 20*b* of jacket bore 20. The diameter of tapered end 20*a* decreases linearly until matching the diameter of straight end 20*b* as indicated by jacket meeting line 20*c*. Four radially spaced threaded jack bores 22 extend through flange 18**.

Figure 3:
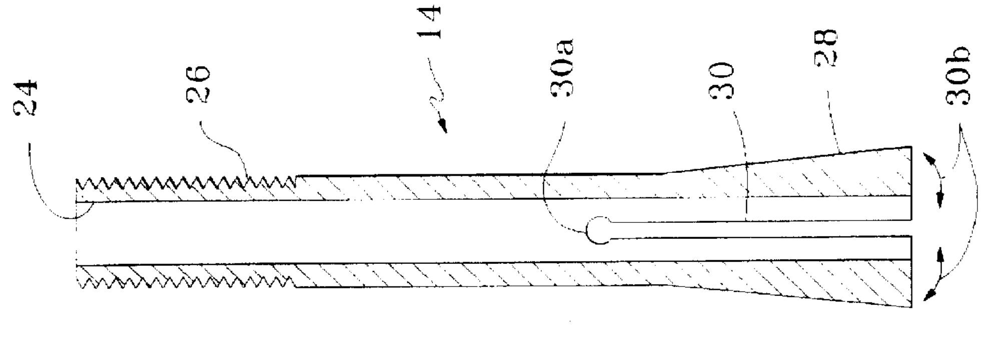
FIG. 3 shows a cross sectional view of the collet portion of the extractor.

Referring now additionally to FIG. 3, there is shown a cross sectional view of collet 14. Collet 14 is basically cylindrical in shape with collet bore 24 extending through collet 14 along the longitudinal axis of collet 14. Collet 14 has a threaded end 26 and a conical end 28, the outside diameter of conical end 28 furthest from threaded end 26 being larger than the outside diameter of threaded end 26 and having a diameter slightly smaller than the diameter of tapered end **20*a* of bore 20. The diameter of conical end 28 decreases in the same proportion as the diameter of tapered end 20*a* until the diameter is slightly smaller than the diameter of straight end 20*b* of bore 20 at collet meeting line 28*a*, as indicated in FIG. 1. This outside diameter is maintained for the remainder of collet 14, including threaded end 26. Three radially spaced relief slots 30 are cut through the cylindrical wall of collet 14 and extend longitudinally from conical end 28 to a point closer to threaded end 26 than collet meeting line 28***a*. Relief bores 30*a* having diameters slightly larger than the width of slots 30 extend radially through the cylindrical walls of collet 14 at the ends of relief slots 30.

Figure 4:
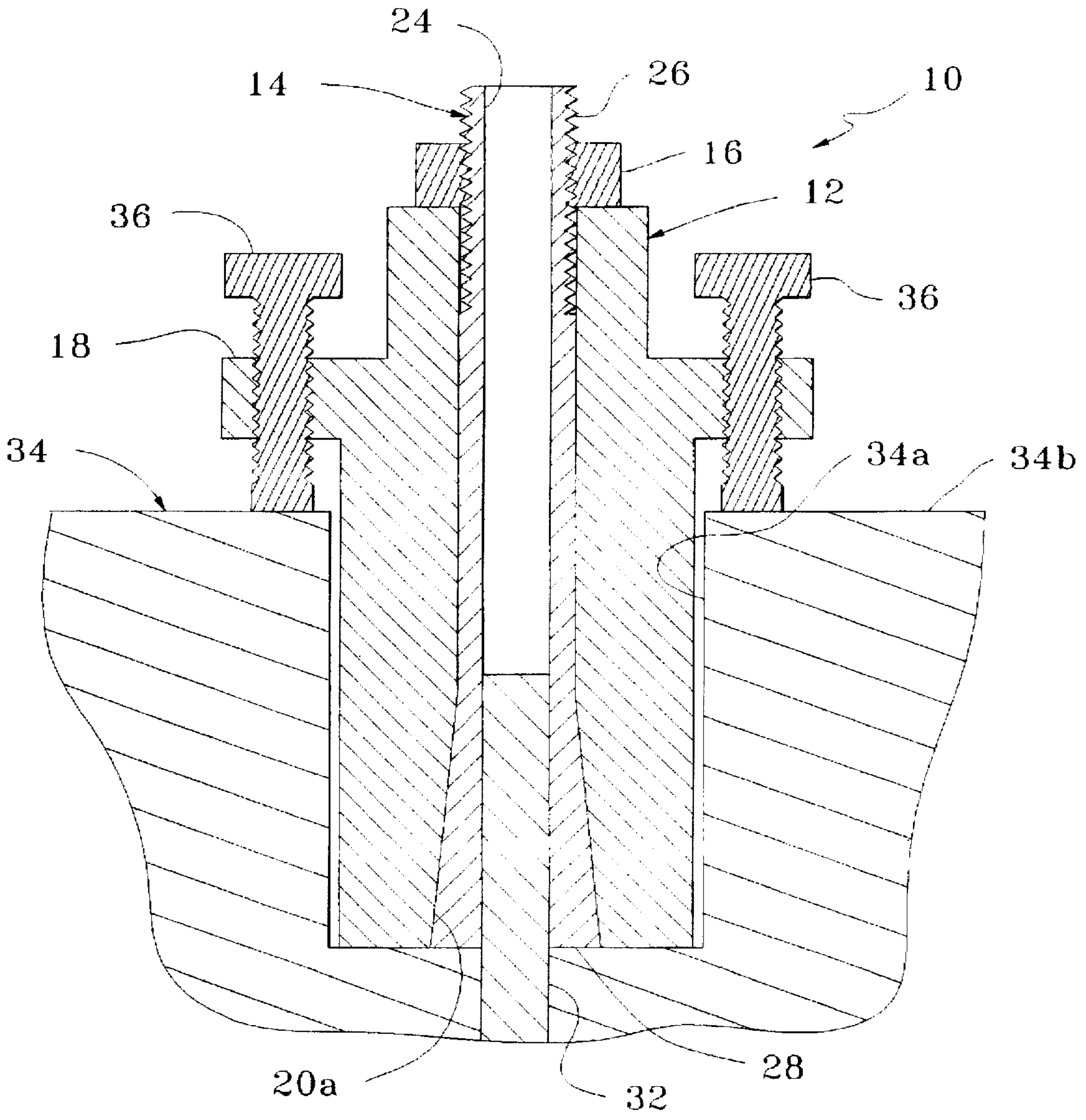
FIG. 4 shows a cross sectional view of the extractor in a position ready for removal of a shaft.

In operation, threaded end 26 of collet 14 is inserted into tapered end 20*a* and through jacket bore 20 until conical end 28 is within tapered end 20*a*. Collet 14 is longer than jacket 12 such that threaded end 26 protrudes beyond straight end 20*b*. Referring now additionally to FIG. 4, there is shown a cross sectional view of extractor 10 in position to start removal of shaft 32. Collet 14 and surrounding jacket 12 are fit over shaft 32, such that shaft 32 extends into collet bore 24. The diameter of collet bore 24 is just slightly larger than the diameter of shaft 32 to accommodate shaft 32 within collet bore 24. Shaft 32 is shown inset within housing 34 in recess 34*a* such that clearance between recess 34*a* and shaft 32 is limited as is the case for the towed array guide tube rollers. For the removal of the guide tube roller shaft, the outside diameter of jacket 12 is such that jacket 12 can be fit within recess 34*a*. Nut 16 is threaded onto threaded end 26 until engaging jacket 12. As nut 16 is tightened against jacket 12, collet 14 is pulled further through jacket 12. The tapered sides of tapered end 20*a* and conical end 28 create a wedging action forcing conical end 28 to flex inwardly as collet 14 is pulled further into jacket 12. Relief slots 30 allow the flexing of conical end 28 as indicated by arrows 30*b* in FIG. 3. The wedging action and inward flexing of conical end 28 creates a strong gripping force between conical end 28 and shaft 32. Nut 16 is tightened until the gripping force on shaft 32 is sufficiently strong to be able to hold shaft 32 while shaft 32 is removed from housing 34. To remove shaft 32, jack screws 36 are threaded into jack bores 22. Flange 18 is fabricated such that it extends beyond edge of recess 34*a* and jack screws 36 can engage upper surface 34*b* of housing 34. As jack screws 36 are tightened, jacket 12, collet 14 and attached shaft 32 are lifted from recess 34*a*. Jack screws 36 are made long enough to accommodate the full length of shaft 32 which needs to be removed from housing 34.

What has thus been described is a shaft extractor which can be used to remove a solid press fit shaft from a housing where access to the shaft is restricted. The extractor has a jacket and a collet. The collet fits around the shaft and the collet in turn fits within the jacket. The exterior of the collet end within which the shaft is placed is tapered and this tapered portion of the collet fits within a similarly tapered bore in the jacket. Longitudinal slots are cut into the tapered portion permitting the tapered portion ends to flex. The collet has a threaded end opposite the tapered portion and the collet is made sufficiently longer than the jacket such that the threaded end protrudes from the jacket when the tapered portion is fully seated within the tapered bore of the jacket. A nut is placed onto the threaded end and tightened such that the collet is pulled further into the jacket. Movement of the tapered end further into the tapered bore creates a wedging action which flexes the collet against the shaft. As the nut is further tightened the wedging action creates a strong gripping force on the shaft. When the shaft is sufficiently held in place, jacking screws are inserted through a flange on the jacket and brought to bear against the shaft housing. Turning the jacking screws pulls the jacket, collet and attached shaft free of the housing. The wedging action of the collet against the shaft allows the extractor to firmly grip the shaft without the need for internal or external threads, notches, or other means of attaching the extractor to the shaft, thus making the extractor capable of removing solid, smooth, press fit shafts. The collet and jacket of the extractor are compact and can be fabricated to operate within a confined space such as the housing recess found in a towed array guide tube roller assembly. Further, the extractor can be easily and economically manufactured from stock materials using standard machining techniques.

Obviously many modifications and variations of the present invention may become apparent in light of the above teachings. For example, the exact shapes and configurations of the particular components shown can be changed to suit manufacturing and assembly considerations as well as the configuration of the shaft and housing. Additionally, the sizes, number and spacing of the jack bores and relief slots can be changed to suit the shaft and housing. Where space allows, the nut and jacking screws can be replaced with lever and cam mechanisms to pull the collet into the jacket and force the extractor away from the housing. Further, depending on the machining process being used and the strength of the material, the collet bore need not extend fully through the collet, such that the collet is solid at the threaded end.

In light of the above, it is therefore understood that within the scope of the appended claims, the invention may be practiced otherwise than as specifically described.

What is claimed is:

1. An extractor for removing a shaft from a housing, the extractor comprising:

a collet portion having a constant diameter bore therein in which the shaft is inserted;

a jacket portion having a tapered bore therein, the collet fitting within the tapered bore of the jacket portion,the collet portion having a tapered exterior surface interfitting with the tapered bore to prevent unrestricted movement of the collet portion in the jacket, the tapered bore and tapered exterior surface decreasing in diameter in a longitudinal direction away from the shaft;

a gripping action means for forcing the tapered exterior surface of the collet portion into the tapered bore of the jacket portion in a longitudinal direction of movement away from the shaft, the movement of the collet portion into the tapered bore of the jacket portion forcing the collet portion to constrict about the shaft, the constriction creating a gripping force between the collet portion and the shaft; and a pulling action means for forcing the jacket portion, collet portion and shaft away from the housing.

2. The extractor of claim 1 further compromising one or more relief slots in the tapered exterior surface of the collet portion, the one or more relief slots facilitating the constriction of the collet portion about the shaft.

3. The extractor of claim 1 wherein the gripping action means comprises:

a threaded end of the collet portion, the threaded end extending through a base end of the jacket portion furthest from the shaft; and a nut for engaging the threaded end of the collet portion, the nut being tightened against the base end of the jacket portion, the tightening of the nut forcing the tapered exterior surface of the collet portion into the tapered bore of the jacket portion.

4. The extractor of claim 1 wherein the pulling action means comprises:

a flange extending radially from the jacket portion; and one or more jack screws threaded through the flange and abutting the housing, the one or more jack screws being tightened against the housing, the tightening of the one or more jack screws against the housing forcing the jacket portion, collet portion and shaft away from the housing.

5. The extractor of claim 1 wherein the jacket portion is sized to fit within a recess in the housing, the shaft being inset within the recess.

* * * * *